Figure 1:
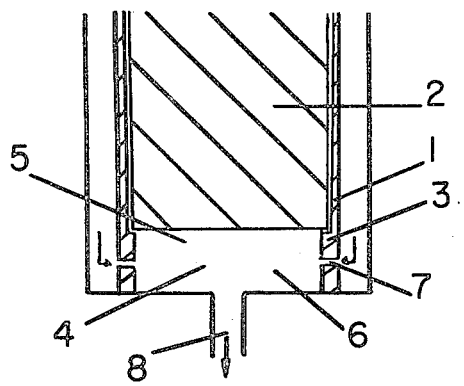

United States Patent [19]

Ballu et al.

[11] 4,353,876

[45] Oct. 12, 1982

[54] APPARATUS FOR MIXING CHEMICAL PRODUCTS UNDER RUNNING WATER

[75] Inventors: Vincent Ballu, Epernay; Rémi Perret, Meyzieu, both of France

[73] Assignee: Rhodic, Ecully, France

[21] Appl. No.: 143,144

[22] Filed: Apr. 23, 1980

[30] Foreign Application Priority Data

Apr. 23, 1979 [FR] France .................................. 79 11186

[51] Int. Cl.³ .......................................... B01D 11/02
[52] U.S. Cl. .................................... 422/263; 137/268; 360/150; 360/165; 422/264; 422/266; 239/310
[58] Field of Search ............... 366/165, 173, 150, 349; 239/310; 137/268; 422/263, 264, 266

[56] References Cited

U.S. PATENT DOCUMENTS

| | | | |
|---|---|---|---|
| 1,350,175 | 8/1920 | O'Connor | 137/268 |
| 1,923,266 | 8/1933 | Houpert | 422/264 |
| 2,044,821 | 6/1936 | Urban | 422/264 |
| 3,083,916 | 4/1963 | Neel | 239/310 |
| 3,933,169 | 1/1976 | Halley | 239/310 |
| 4,023,778 | 5/1977 | Joly | 366/165 |
| 4,249,562 | 2/1981 | King | 239/310 |
| 4,250,911 | 2/1981 | Kratz | 239/310 |

Primary Examiner—Robert W. Jenkins
Attorney, Agent, or Firm—McDougall, Hersh & Scott

[57] ABSTRACT

A device for mixing chemical products with running water. It is characterized in that the tubular pipes for the supply of running water are situated in a different plane from the inlet plane of the mixing chamber disintegration zone.

9 Claims, 6 Drawing Figures

APPARATUS FOR MIXING CHEMICAL PRODUCTS UNDER RUNNING WATER

This is an improvement over the device described in U.S. Pat. No. 4,023,778 issued on May 17, 1977 and entitled "A Device for Mixing Chemical Products with Tap Water." U.S. Pat. No. 4,023,788 relates to a device for the homogeneous mixing under running water of chemical products in the form of a compact solid or "cartridge" which can be disintegrated in water, this device comprising:

(a) on the one hand, a magazine containing the cartridge in such a way that it exhibits a substantially constant free surface, (b) on the other hand a mixing chamber comprising a disintegration zone which is defined on one side by the free face of the cartridge and comprising lateral running water feed pipes tangentially to this surface, characterized in that:

(i) the pipes are tubular, small in cross-section, distributed in a small number round the periphery of the magazine and located in a plane which is substantially perpendicular to the axis of the said magazine, (ii) the disintegration zone is extended by a zone for homogenizing the mixture which is larger in volume than the former, is connected to it and comprises an outlet pipe for the mixture.

This device preferably also comprises pressure means for maintaining, throughout the service life of the cartridge, the free face of the cartridge abutted against the positioning means situated at the inlet to the disintegration zone of the mixing chamber.

The mixing chamber can be of various shapes such as, for example, those illustrated in the above patent, in particular cylindrical or conical.

Devices of this type comprises a conical mixing chamber have been used successfully in sprayers for amateur gardeners.

These devices are characterised by a low mixing chamber height relative to the magazine diameter. "Under low mixing chamber height relative to the magazine diameter" is believed to mean a height such as its ratio over the magazine diameter is generally comprised between 1/15 and ¼. As examples, performing devices were made with a conical mixing chamber having a height of 6, 7 and 6 mm and respective magazine diameters of 30, 36 and 38 mm, i.e., with ratios comprised between 1/6 and 1/5. Other devices have been constructed with a cylindrical mixing chamber of a height of 4 mm and a magazine diameter of 38 mm, i.e. with a ratio of 0,11, near 1/10. Moreover, they are used upstream of an atomisation nozzle or any other obstacle to the flow of water thus subjecting the assembly to pressure. Under these conditions, the mixing chamber is virtually filled with water, but this does not prevent disintegration in contact with the free surface of the cartridge then the passage of the aqueous dispersion into the homogenization zone.

However, when these devices are made of plastic, particularly by injection moulding, the presence of an orifice from the chamber complicates manufacture considerably. The manufacturing cost is also increased in the case of a non-cylindrical mixing chamber.

Means of overcoming these disadvantages without imparing the performance of the device according to the invention forming the subject of the above patent have now been found. In particular, when the device is mounted upstream of an automisation nozzle or a similar obstacle to the flow of water and the mixing chamber height is low relative to the magazine diameter, the mixture can be obtained under similar conditions if the tubular water feed pipes are not directly tangential.

For example, they can be situated in a plane parallel to that of the inlet into the disintegration zone (this plane contains feed pipes according to the above patent and is generally perpendicular to the magazine axis).

This property is advantageous in the case of a cylindrical mixing chamber in which the plane of the feed pipes can be substantially that of the downstream wall of the mixing chamber. In this case, the feed pipes can advantageously be constituted by, on the one hand, a furrow or groove made in the thickness of the cylindrical wall of the mixing chamber and, on the other hand, the edge of the downstream portion of the said chamber. These two portions can also be different and detachable or connected to each other in a definitive manner.

The tubular pipes need not be coplanar and can form an angle of up to 90° with the disintegration zone inlet plane. According to an advantageous embodiment, these pipes are normal to the mixing chamber wall.

Another improvement involves extending the upstream end of the mixing chamber outlet pipe inside the mixing chamber to the level of the disintegration zone inlet.

In the context of the present invention, the term "extension" refers not only to an extension without a change in the cross-sectional area of the outlet pipe but also to extensions comprising a modification in the cross-section which can either be a widening or a contraction of the pipe, providing that the cross-section remains sufficient for the passage and delivery of the aqueous dispersion of phytosanitary product. This extension will preferably be concentric with the magazine wall.

Moreover, the upper portion of the extension is located level with the disintegration zone inlet and therefore forms the abutment on which the cartridge rests during operation of the device. This type of abutment does not affect the flow and concentration properties of the aqueous dispersion at the level of the outlet pipe. On the contrary, it is much easier to produce than lateral abutments on the magazine wall according to the above patent.

The invention will be better understood with the aid of the following FIGS. 1 to 6 which show variations of the subject of the present addition schematically in a longitudinal section.

Figure 4:
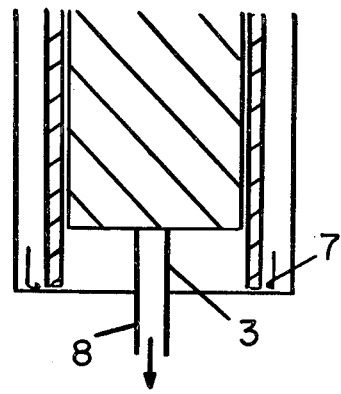
Figure 5:
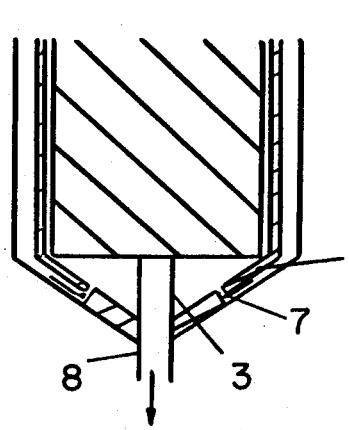
Figure 6:
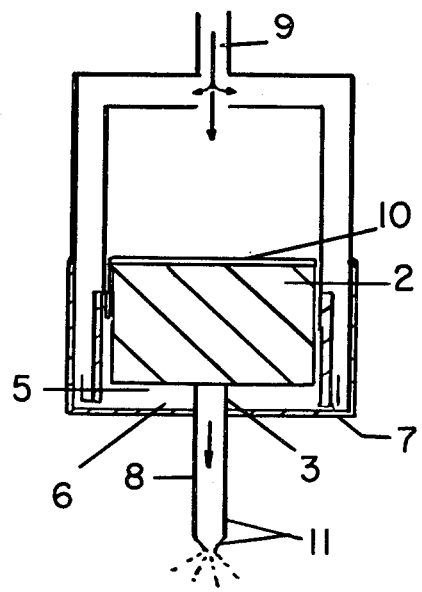

For the sake of simplicity, FIGS. 1 to 5 do not show the upstream portion of the device which is illustrated only in FIG. 6.

In all these Figures, the device comprises a magazine (downstream portion) 1 containing the cartridge 2 resting on the abutment means 3, the mixing chamber 4 comprising the disintegration zone 5 and the homogenization zone 6 and at least one feed pipe 7 (two illustrated) and an outlet pipe 8.

Figure 2:
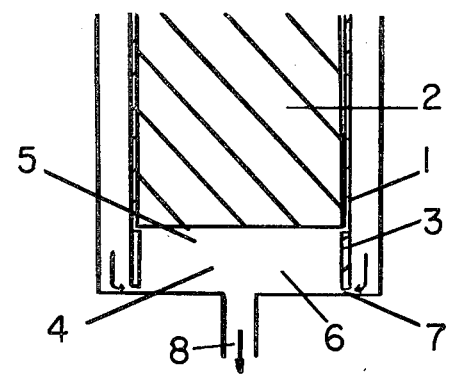
Figure 3:
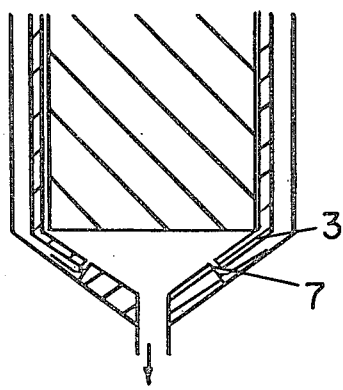

More specifically, FIGS. 1 to 3 show variations illustrating various positions of the feed pipes for water under pressure either in a plane parallel to the level of the disintegration zone inlet or half way up the mixing chamber (cf. FIG. 1) or level with the downstream wall (flat here) of this chamber (cf. FIG. 2), or alternatively in a plane intersecting this level in the case of a conical chamber, the pipes being normal to the chamber wall (cf. FIG. 3).

FIGS. 4 to 6 illustrate three variations of the device according to the invention combining the two improvements forming the subject of the present application on two forms of mixing chamber which are cylindrical and conical respectively.

FIG. 6 shows a complete spraying appliance for an amateur gardener employing the device according to the invention. The running water or water under pressure splits at the inlet 9 of the appliance into two streams, one of which is central and ensures pressure against the water-tight plastic film 10 surrounding the cartridge 2 while the other is peripheral and leads to the feed pipes 7 to the mixing chamber 4. After disintegration in the disintegration zone 5 in contact with the cartridge, the water charged with product is homogenized in the homogenization zone 6 then passes into the pipe 3 (acting as an abutment for the cartridge) and the outlet pipe 8 toward an atomisation nozzle 11.

We claim:

1. In a device for homogeneously mixing chemical products with water in which the chemical product is embodied in a water-splittable cartridge, said device comprising an enclosure and means subdividing the enclosure into a magazine dimensioned to receive the cartridge and a mixing chamber with one side of the magazine open to the mixing chamber, said mixing chamber having a low height relative to the magazine diameter, stop means positioned to engage the cartridge to retain the cartridge within the magazine with a free surface of the cartridge exposed to the mixing chamber, said mixing chamber being formed of a splitting zone and a homogenization zone with the splitting zone adjacent the magazine, an outlet in communication with the homogenization zone, at least one inlet in communication with the mixing chamber for the introduction of water into the mixing chamber for engagement with the free surface of the cartridge whereby chemical product is split from the cartridge into the splitting zone and homogenized with water in the homogenization zone before issuing from the outlet, the improvement in which the inlets for the introduction of water into the mixing zone are situated beyond the plane separating the magazine from the mixing chamber.

2. A device according to claim 1, in which the inlets comprise feed pipes in the form of two detachable portions one being constituted by a notch in a lateral wall of the mixing chamber and the other by the said spaced wall.

3. A device according to claim 1, in which the axis of each of the inlets are disposed at an angle of from 0° to 90° with the axis of the magazine.

4. A device according to claim 3, in which the mixing chamber is conical in shape and in that the axis of the inlets is perpendicular to the conical wall of the mixing chamber.

5. A device as claimed in claim 1 which includes a wall at the end of the homogenization zone spaced from and opposite the open side of the magazine and in which the inlets are located in a plane which is tangential to said wall.

6. A device as claimed in claim 1 in which the inlets comprise a number of tubular pipes arranged about the periphery of the mixing chamber.

7. A device as claimed in claim 1 which includes pressure means for maintaining, throughout the service life of the cartridge, the free face thereof in engagement with side stop means.

8. A device as claimed in claim 1 in which the outlet comprises a pipe which extends to the interface between the magazine and the mixing chamber to constitute the stop means for retaining the cartridge within the magazine with the free surface exposed to the mixing chamber.

9. A device according to claim 8, characterised in that the outlet pipe and its upstream extension are concentric with the magazine wall.

* * * * *